United States Patent
Suryanarayana et al.

(10) Patent No.: US 12,159,133 B2
(45) Date of Patent: Dec. 3, 2024

(54) INFORMATION HANDLING SYSTEM WITH A DYNAMIC BASIC INPUT/OUTPUT SYSTEM CONFIGURATION MAP

(71) Applicant: DELL PRODUCTS L.P., Round Rock, TX (US)

(72) Inventors: Shekar Babu Suryanarayana, Bangalore (IN); Karunakar Poosapalli, Bangalore (IN); Hung V. Ho, Pflugerville, TX (US); James L. Walker, Cedar Park, TX (US); Tsung-Lin Chuang, New Tapei (TW); Chia-Hao Chang, Caotun Township (TW); Te-Lung Lin, Taipei (TW)

(73) Assignee: Dell Procucts L.P., Round Rock, TX (US)

( * ) Notice: Subject to any disclaimer, the term of this patent is extended or adjusted under 35 U.S.C. 154(b) by 91 days.

(21) Appl. No.: 17/970,821

(22) Filed: Oct. 21, 2022

(65) Prior Publication Data

US 2024/0134631 A1 Apr. 25, 2024
US 2024/0231802 A9 Jul. 11, 2024

(51) Int. Cl.
*G06F 8/654* (2018.01)
*G06F 8/61* (2018.01)
*G06F 11/07* (2006.01)

(52) U.S. Cl.
CPC ............. *G06F 8/654* (2018.02); *G06F 8/63* (2013.01); *G06F 11/0766* (2013.01)

(58) Field of Classification Search
None
See application file for complete search history.

(56) References Cited

U.S. PATENT DOCUMENTS

| | | | | |
|---|---|---|---|---|
| 7,210,010 | B2* | 4/2007 | Ogle | G06F 8/654 |
| | | | | 711/100 |
| 8,239,665 | B2* | 8/2012 | Liu | H04L 41/0803 |
| | | | | 713/1 |
| 8,972,973 | B2* | 3/2015 | Cavalaris | G06F 8/654 |
| | | | | 717/172 |
| 9,507,581 | B2* | 11/2016 | Butcher | G06F 8/654 |
| 10,776,488 | B2* | 9/2020 | Samuel | G06F 9/4401 |
| 11,726,880 | B1* | 8/2023 | Vidyadhara | G06F 9/4401 |
| | | | | 714/36 |
| 2021/0048997 | A1 | 2/2021 | Samuel et al. | |
| 2022/0083324 | A1 | 3/2022 | Singh et al. | |

* cited by examiner

*Primary Examiner* — Marina Lee
(74) *Attorney, Agent, or Firm* — Larson Newman, LLP (57) ABSTRACT

An information handling system includes a memory and a processor. The memory stores a current basic input/output system (BIOS) firmware image. During a regular boot mode of the information handling, the processor creates a first set of tables associated with the current BIOS firmware image, stores the first tables to the memory, and receives a BIOS firmware update image. During a BIOS update boot mode of the information handling system, the processor creates a second plurality of tables associated with the BIOS firmware update image, and compares the first and second tables. In response to a difference being determined between the first and second tables, the processor aborts the BIOS update boot mode and generate an error log.

19 Claims, 6 Drawing Sheets

INFORMATION HANDLING SYSTEM WITH A DYNAMIC BASIC INPUT/OUTPUT SYSTEM CONFIGURATION MAP

FIELD OF THE DISCLOSURE

The present disclosure generally relates to information handling systems, and more particularly relates to a dynamic basic input/output system configuration map.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and a processor. The memory may store a current basic input/output system (BIOS) firmware image. During a regular boot mode of the information handling, the processor may create a first set of tables associated with the current BIOS firmware image, store the first tables to the memory, and receive a BIOS firmware update image. During a BIOS update boot mode of the information handling system, the processor may create a second plurality of tables associated with the BIOS firmware update image, and compare the first and second tables. In response to a difference being determined between the first and second tables, the processor may abort the BIOS update boot mode and generate an error log.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
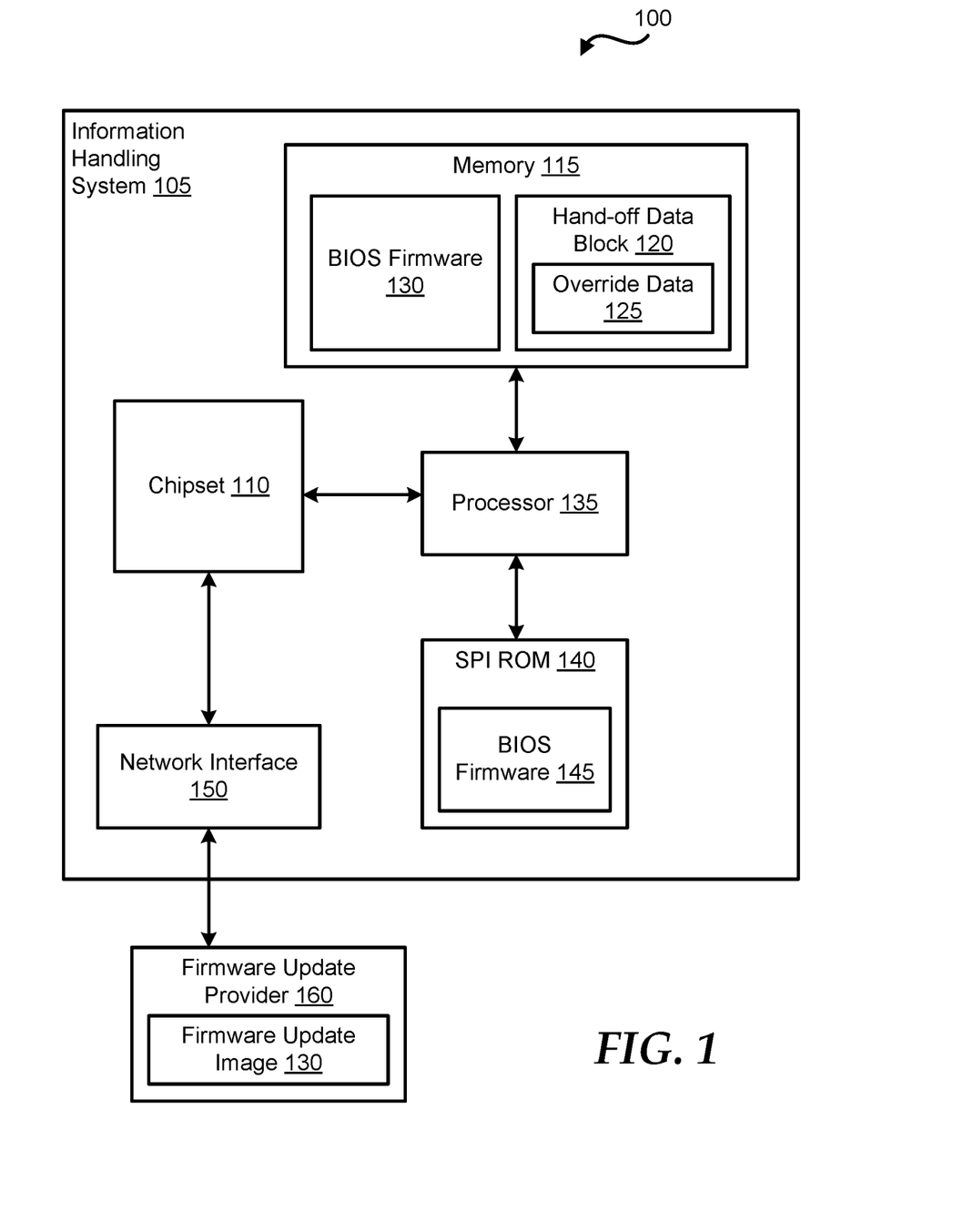
FIG. 1 is a diagram of a portion of an information handling system according to at least one embodiment of the present disclosure.

FIG. 1 illustrates a portion of a system 100 including an information handling system 105 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

System 100 includes an information handling system 105 and a firmware update provider 160. Information handling system 105 includes a chipset 110, a memory 115, a processor 135, an SPI ROM 140, and a network interface 150. Memory 115 includes a hand-off data block 120 and a BIOS base firmware 130. SPI ROM 140 includes a BIOS firmware 145. Firmware update provider 160 may communicate with components of information handling system 105 over an network Chipset 110 may be any system, device, or apparatus configured to control certain data paths such as data flow between processor 135, memory 115, and other peripherals such as network interface 150. Chipset 110 may also support certain functions of processor 135. Chipset 110 can include a platform controller hub (PCH), a fusion control hub (FCH), or the like.

Figure 6:
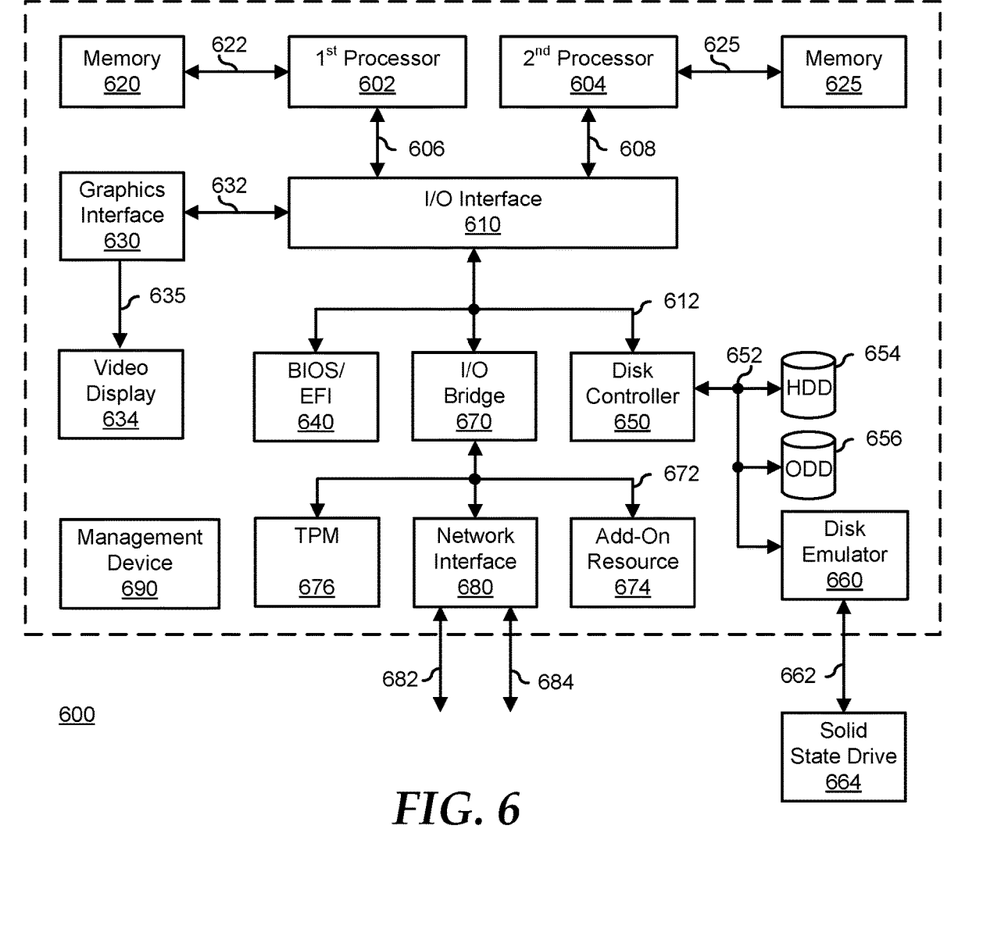
FIG. 6 is a block diagram of a general information handling system according to an embodiment of the present disclosure.

Memory 115 is similar to memories 620 and 625 of FIG. 6 and includes random access memory (RAM) such as an SRAM, DRAM, NV-RAM, ROM, or the like. Memory 115 can store, for example, at least one application, an operating system, BIOS base firmware 130, and hand-off data block 120. Memory 115 can also store platform-specific override data 125 to be used in patching BIOS base firmware 130. Hand-off data block 120, also referred to as a hand-off block 120, is a binary data structure that passes system state information.

SPI ROM 140 may be configured to store one or more firmware volumes such as BIOS firmware 145. SPI ROM 140 may also be referred to as a flash memory device, SPI flash, BIOS NV-RAM, or the like. The storage capacity of the flash memory device is typically limited to 32 MB or 64 MB of data.

Override data 125 are platform-specific data for updating configuration settings in BIOS base firmware 130. Override data 125 may be used to configure specific functions within chipset 110 and processor 135 early in the boot process, such as in the pre-EFI initialization (PEI) phase. For example, Intel® implements PCH soft straps to configure specific functions within the chipset or a PCH that reads the soft strap data from the SPI ROM. In another example, AMD implements the platform security processor (PSP) configuration blocks to set different configurations on the chipset or PCH. PCH soft straps and PSP configuration blocks are examples of programmable hardware configurations provided by the chipset vendor so that an original equipment manufacturer (OEM) can have the flexibility to configure hardware functions.

Override data 125, may also be referred to as a patch which is a piece of code used to provide a fix to the firmware for the difference between a base platform and a target platform. Generally, a BIOS update package may include a base BIOS firmware image and one or more patches. The patch may be used to disable certain components or devices of an information handling system. For example, in TCO Legacy/Compatible mode, the host SMBus is used. In this mode, other SMBus controllers, such as Intel Converged Security and Management Engine SMBus controllers, are not used and could be disabled by a PCH soft strap. Each patch may include at least a flash page or simply a page of code. The page is the smallest unit of virtual flash memory that can be programmed or written to, typically of a fixed length 8-16 kilobytes in size as may be determined by processor architecture.

BIOS firmware, such as BIOS firmware 145 and BIOS base firmware 130, can be referred to as BIOS code or simply BIOS. In an embodiment, BIOS firmware can be compliant with one or more revisions of the Unified Extensible Firmware Interface (UEFI) specification. As used herein, the term EFI is used synonymously with the term UEFI. The UEFI standard replaces the personal computer BIOS system found in some older information handling systems. However, the term BIOS is often still used to refer to the system firmware.

BIOS firmware 145 includes instructions executable by processor 135 to initialize and test the hardware components of information handling system 105 and to load a boot loader or an operating system from a mass storage device. BIOS firmware 145 additionally provides an abstraction layer for the hardware, which is a consistent way for application programs and operating systems to interact with the keyboard, display, and other input/output devices. When power is first applied to information handling system 105, the system begins a sequence of initialization procedures. During the initialization sequence, also referred to as a boot sequence, components of information handling system 105 are configured and enabled for operation, and device drivers can be installed.

During the lifetime of the information handling system 105, it may become necessary or advisable to update the BIOS firmware 145 with a new firmware version, such as with BIOS base firmware 130. This procedure is often referred to as flashing the BIOS. The BIOS firmware may be updated using a BIOS update package that typically includes a base BIOS firmware image that supports multiple platforms such as BIOS base firmware 130. During this process, the previous BIOS firmware may be deleted, and the revised BIOS firmware can be stored at the flash memory device. For example, BIOS firmware 145 may be deleted and BIOS base firmware 130 may be stored at SPI ROM 140 instead.

In an example, when firmware update provider 160 sends or transmits a BIOS update release, such as firmware update image 130, to information handling system 105, the firmware update image may be stored as BIOS base firmware 130 in memory 115. In response to the BIOS firmware update being stored in memory 115, processor 135 or any other component in information handling system 105 may perform any suitable operations to update or recover BIOS firmware 145. For example, an initial boot block (IBB) may be loaded from an onboard flashed BIOS, such as BIOS firmware 145. In an example, modules in the IBB may run at the PEI phase, which is responsible for BIOS integrity checks, memory initialization, and loading the BIOS into the system memory. After the IBB is loaded, an original equipment manufacturer (OEM) specific boot block (OBB) may be loaded from an external BIOS image that is going to be the updated new BIOS image for information handling system 105. In an example, modules in OBB run at DXE phase and the OBB may have all of the OEM features and modules, and establish root of trust between IBB and OS or any other third-party image.

In certain examples, the IBB may include an old silicon code/structure configuration, and the OBB may have a new silicon code/structure configuration. In previous information handling systems, a difference between the onboard IBB configuration and the new OBB configuration may lead to a system boot failure and BIOS recovery failures. These previous information handling systems did not have a mechanism or component to create a layer between onboard firmware and new update firmware to handle the firmware verification failures and firmware failures.

In an example, BIOS update failures may occur based on different conditions. For example, BIOS verification failures may result when a mismatch occurs between reference code structures of the old and new BIOS images, when there is a mismatch between BIOS attributes, when there are mismatches between platform configuration data (PCD) token numbers of the old and new BIOS images, or the like.

Information handling system 105 may be improved by processor 135 dynamically migrate platform data across various firmware versions to make a seamless recovery. Information handling system 100 may further be improved by processor 135 detecting boot path failures and dynamically generating boot path failure indicators. In this situation, the boot path failure indicators may be utilized to bridge a verification path and an update system boot mode to recover a platform with a safe trusted firmware update. Another improvement to information handling system 105 includes generation of a variable configuration mapping table for seamless solution for CPU or chipset failures. Processor 135 may also improve information handling system 105 by parsing common configuration patch table and identify variable mismatches at OS runtime to decide a boot mode for a flash process and send configuration details to telemetry.

Additional, improvements to information handling system 105 may include preventing OBB verification failures based on processor 135 executing a dynamic PCD token parser with PCD token number and GUID. In this situation, processor 135 may generate a build time dynamic PCD database binary which in turn builds in a BIOS ROM layout. Information handling system 105 may be improved by execution of a seamless BIOS recover and a unique failover to prevent BIOS corruptions based on a recovery library and a recovery PCD database.

During a regular boot of information handling system 105, a BIOS of the information handling system may dynamically create an onboard mapping table, which in turn may be stored in memory 115 or any other suitable memory of the information handling system. In an example, the mapping table may enumerate variables and offset values, which in turn may be utilized to create a setup variable mapping table. In certain examples, the BIOS may create a mapping table for a common configuration patch table and associated offset values, and a mapping table for a platform specific configuration patch table and associated offset values. In an example, the data associated with the mapping tables may be saved into a hand-off block (HOB), such as HOB 120. Based on the mapping table data being saved in HOB 120, the HOB may pass the data to the DXE phase of the boot operation so that the mapping tables may be save into a non-volatile memory space, such as in a memory space of memory 115.

In an example, processor 135 may perform or execute any suitable operations to create and store the mapping tables. For example, processor 135 may execute a structure variable parser to enumerate and parse structures and variables for different components of information handling system 105. Processor 135, via structure variable parser, may also setup variable structures and create a mapping table for the different variables, the sizes and offset locations. As stated above, the created mapping tables may be stored in a non-volatile memory. In an example, processor 135 may also create a configuration patch table with override values, such as override data 130, and different setup variables and features. In certain examples, the configuration patch table and override data 130 may include override variables, sizes, offset locations, and mapped PID. Processor 135 may create a different customized table for each platform of information handling system 105, and each customized table may include customized variables, sizes, offset values, and mapped PIDs.

In response to a BIOS update image, such as firmware update image 130, being received from firmware update provider, processor 135 may extract and parse a new BIOS image mapping table, a common configuration patch table, a platform configuration table, or the like. Based on the extracted data, processor 135 may compare the stored mapping table data to the extracted mapping tables data from the firmware update image 130. In certain examples, firmware update image 130 may include new BIOS reference code, new BIOS setup changes, or the like. In an example, processor 135 may determine whether any differences exist between the stored mapping tables and the newly extracted mapping tables.

If one or more differences are determined, processor 135 may abort the BIOS update to prevent a failure of the BIOS update. Processor 135 may also create and store an entry to a BIOS post error log. In an example, the entry may include data to indicate the differences. For example, if any variable member default value is modified or any member values are deleted in the new BIOS update, that variable member default value may be different between BIOS firmware 145 and firmware update image 130. If the values are not updated in a platform configuration patch table or a common configuration patch table, processor 135 may determine that the offset and variable name of that variable member that caused the difference between the onboard BIOS image and the new BIOS image. In an example, if any errors or mismatches are detected, the error log may be provided to a manufacturer as telemetry data, which in turn may perform a root cause analysis to fix the update mismatch remote from information handling system 105. In response to the BIOS update error being corrected, a new BIOS update may be provided to information handling system 105.

In an example, processor 135 may perform one or more suitable operations to detect boot failure indicators for verification failure, and implement a system boot mode for safe and trusted firmware updates. For example, processor 135 may create a resilience layer between the onboard firmware, BIOS firmware 145, and the new update firmware, firmware update image 170. In certain examples, the resilience layer may be created based on configuration mapping, attribute mapping, creating dynamic platform configuration map tables, or the like.

Figure 2:
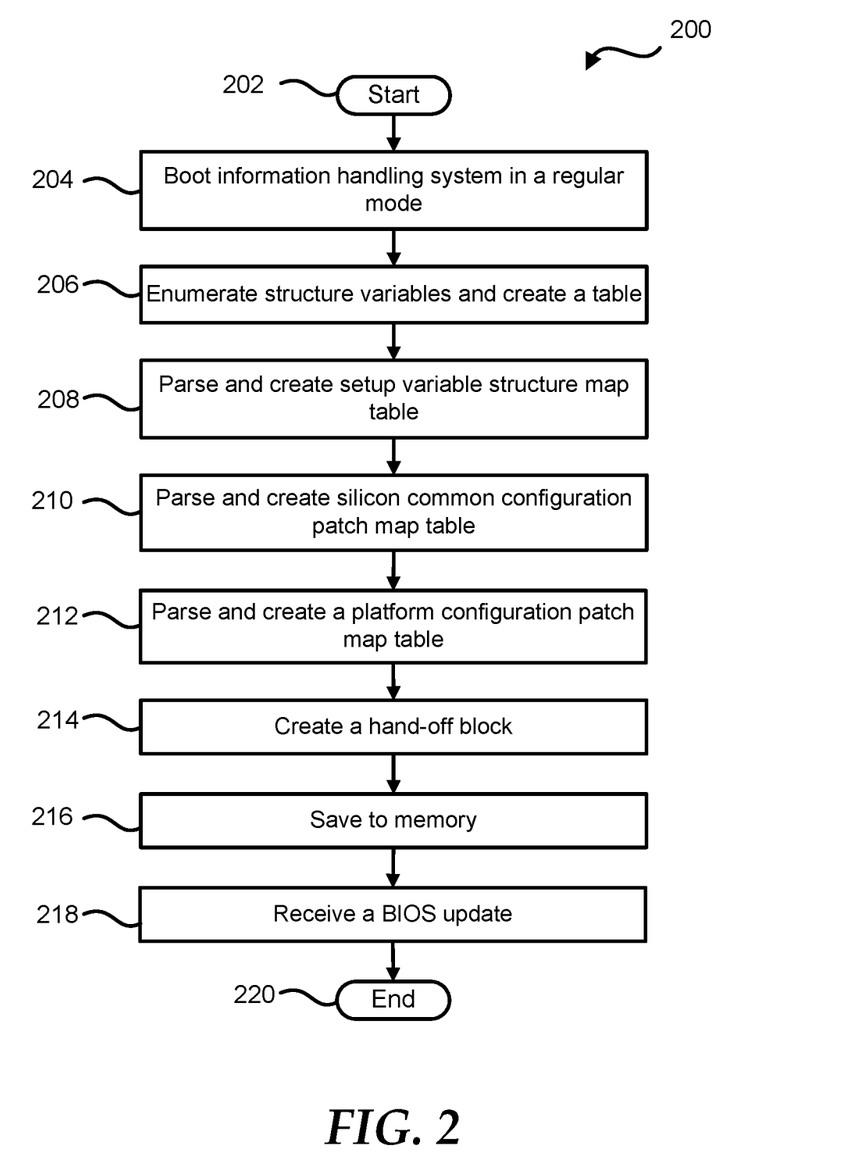
FIG. 2 is a flow diagram of a method for creating a platform configuration patch map table according to at least one embodiment of the present disclosure.

FIG. 2 is a flow diagram of a method for creating a platform configuration patch map table according to at least one embodiment of the present disclosure, starting at block 202. In an example, the method 200 may be performed by any suitable component including, but not limited to, processor 135 of FIG. 1 or BIOS 640 of FIG. 6. Not every method step set forth in this flow diagram is always necessary, and certain steps of the methods may be combined, performed simultaneously, in a different order, or perhaps omitted, without varying from the scope of the disclosure.

At block 204, an information handling system is booted in a regular boot mode. At block 206, structure variables are enumerated and a table is created. In an example, the table may be a variable mapping table, which includes the structure variables and offset values. At block 208, the data of the table is parsed and a setup variable structure map table is created. At block 210, the data is parsed and a common configuration patch map table is created. At block 212, a platform configuration patch map table is created based on the parsed data.

At block 214, a HOB is created. In an example, the HOB may be utilized to move the boot operations from the PEI phase to the DXE phase. During the DXE phase, the created tables are store in a memory at block 216. At block 218, a BIOS update is received and the flow ends at block 220. In an example, the BIOS update may include new BIOS reference code, new BIOS setup changes, or the like.

Figure 3:
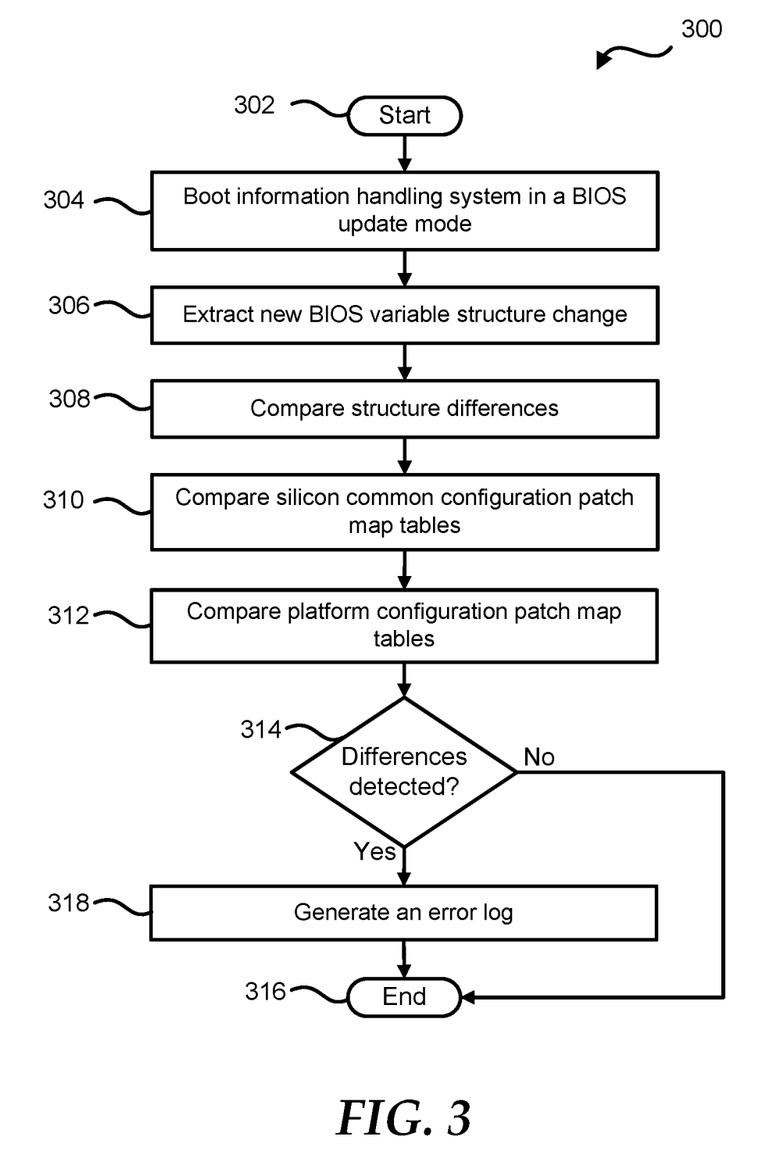
FIG. 3 is a flow diagram of a method for determining whether a difference exist between an onboard basic input/output system (BIOS) variable structure and a new BIOS variable structure according to at least one embodiment of the present disclosure.

FIG. 3 shows a method 300 for determining whether a difference exist between an onboard BIOS variable structure and a new BIOS variable structure according to at least one embodiment of the present disclosure, starting at block 302. In an example, the method 300 may be performed by any suitable component including, but not limited to, processor 135 of FIG. 1 or BIOS 640 of FIG. 6. Not every method step set forth in this flow diagram is always necessary, and certain steps of the methods may be combined, performed simultaneously, in a different order, or perhaps omitted, without varying from the scope of the disclosure.

In an example, the method 300 of FIG. 3 may take place during boot operations after the BIOS update is received in block 218 of FIG. 2. At block 304, the information handling system is booted in a BIOS update mode. At block 306, a new BIOS variable structure change is extracted. In an example, the new BIOS variable structure change may be extracted from the BIOS update image. In certain examples, the BIOS variable structure change may include, but is not limited to, a new BIOS image mapping table for structure, a new common configuration patch table, and a platform configuration table.

At block 308, BIOS structure differences between a current BIOS image and the newly received BIOS update images are compared. At block 310, common configuration patch table differences between a current BIOS image and the newly received BIOS update images are compared. At block 312, platform configuration patch map table differences between a current BIOS image and the newly received BIOS update images are compared.

At block 314, a determination is made whether one or more differences between the current BIOS image and the new BIOS update image have been detected. In an example, differences may exist if any variable member default value is modified or deleted, or the like. If no differences are detected the flow ends at block 316. If one or more differences are detected, the BIOS update is stopped and an error log is created at block 318, and the flow ends at block 316. In certain examples, the stopping of the BIOS update may prevent an update failure within the information handling system. In an example, the error log may be provided to a manufacturer a telemetry data so that the BIOS update image may be changed or corrected to no longer include one or more mismatches or differences.

Figure 4:
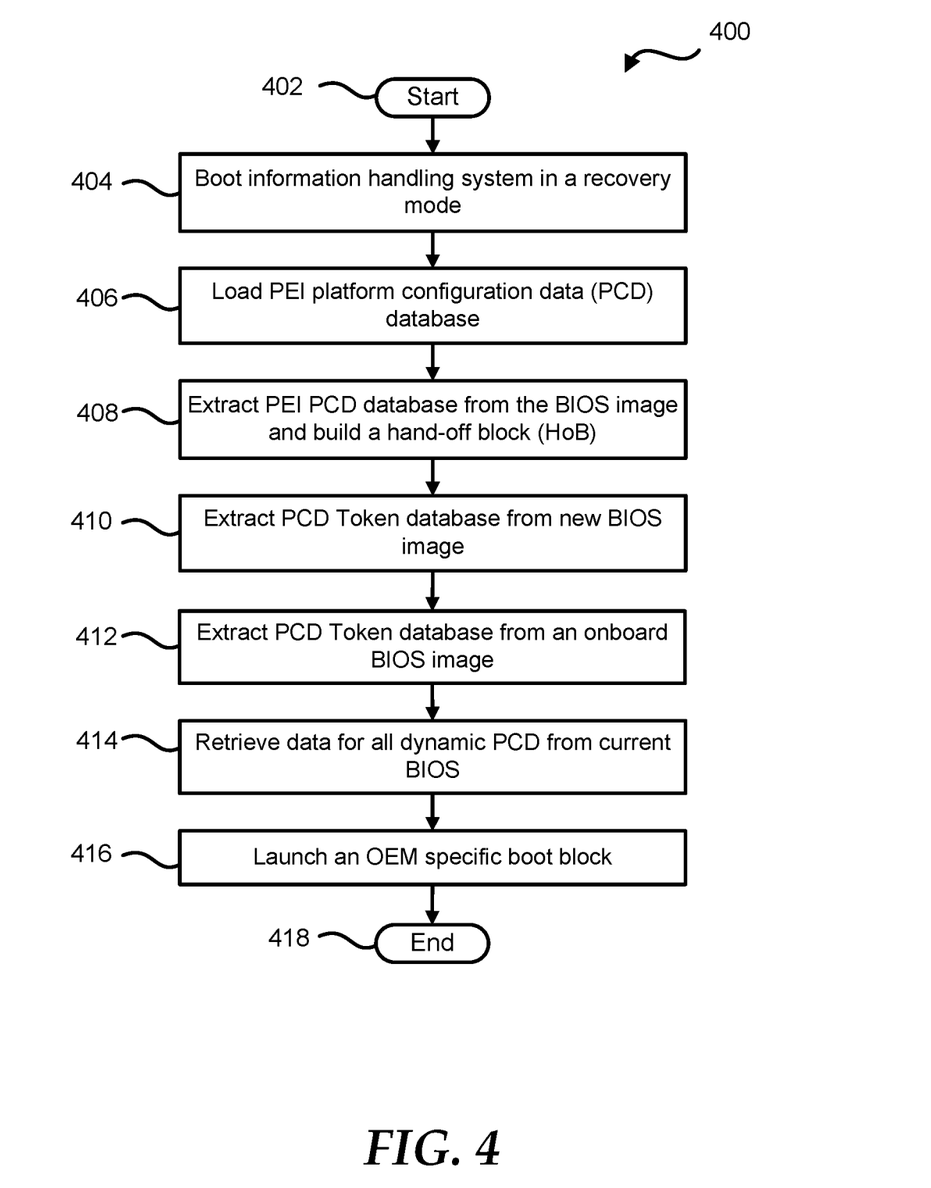
FIG. 4 is a flow diagram of a method for performing a first portion of a firmware recovery in an external basic input/output system according to at least one embodiment of the present disclosure.

FIG. 4 shows a method 400 for performing a first portion of a firmware recovery in an external basic input/output system according to at least one embodiment of the present disclosure, starting at block 402. In an example, the method 400 may be performed by any suitable component including, but not limited to, processor 135 of FIG. 1 or BIOS 640 of FIG. 6. Not every method step set forth in this flow diagram is always necessary, and certain steps of the methods may be combined, performed simultaneously, in a different order, or perhaps omitted, without varying from the scope of the disclosure.

At block 404, an information handling system is booted in a BIOS recovery mode. At block 406, a PEI PCD database is loaded. In an example, a PCD token number and GUID may be utilized to generate or load the PCD database. At block 408, a PEI PCD database is extracted from a BIOS image and a HOB is created. The PEI PCD database may be stored in a BIOS ROM during the boot operations of the information handling system. At block 410, a PCD token database is extracted from a new BIOS image.

At block 412, a PCD token database is extracted from an onboard BIOS image. At block 414, data for all dynamic PCD is retrieved from the current BIOS. At block 416, an OEM specific boot block (OBB) is launched and the flow ends at block 418. In an example, the OBB may be launched from an external BIOS image.

Figure 5:
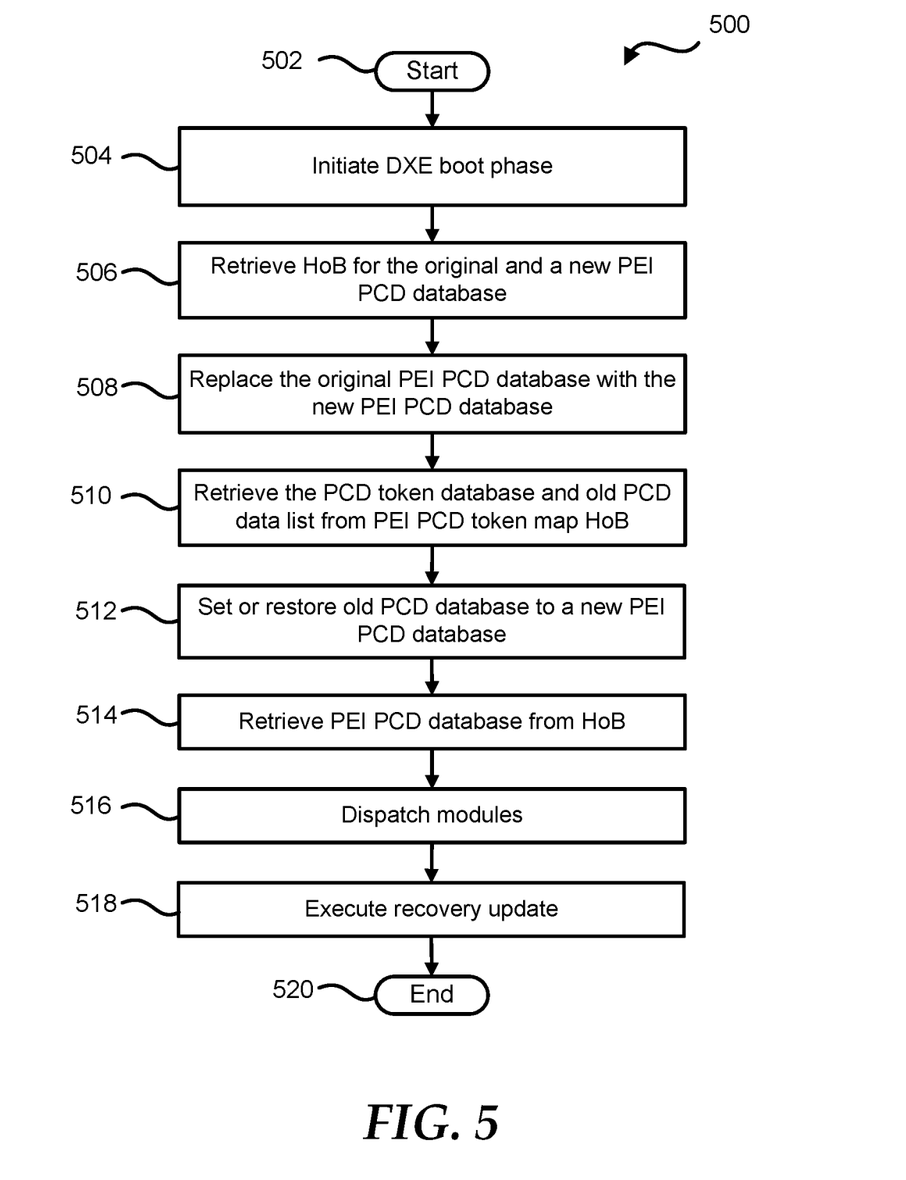
FIG. 5 is a flow diagram of a method for performing a second portion of the firmware recovery in an external basic input/output system according to at least one embodiment of the present disclosure.

FIG. 5 shows a method 500 for performing a second portion of the firmware recovery in an external basic input/output system according to at least one embodiment of the present disclosure, starting at block 502. In an example, the method 500 may be performed by any suitable component processor 135 of FIG. 1 or BIOS 640 of FIG. 6. Not every method step set forth in this flow diagram is always necessary, and that certain steps of the methods may be combined, performed simultaneously, in a different order, or perhaps omitted, without varying from the scope of the disclosure.

In an example, the method 300 of FIG. 3 may take place during boot operations after the OBB is launched in block 416 of FIG. 4. At block 504, a DXE boot phase is initiated. At block 506, a HOB for an original PCD database and a new PEI database is retrieved. At block 508, the original PEI PCD database is replaced with the new PEI PCD database.

At block 510, the PCD token database and an old PCD data list are retrieved from a PEI PCD token map HOB. At block 512, old PCD database is set or restored to a new PEI PCD database. At block 514, the PEI database is retrieved from the HOB. At block 516, modules for the PCD database are dispatched. At block 518, a recovery update is executed, and the flow ends at block 520.

FIG. 6 shows a generalized embodiment of an information handling system 600 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 4394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (00B) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
 a memory to store a current basic input/output system (BIOS) firmware image; and
 a processor to communicate with the memory, the processor to:
  during a regular boot mode of the information handling:
   create a first plurality of tables associated with the current BIOS firmware image;
   store the first tables to the memory; and
   receive a BIOS firmware update image; and
  during a BIOS update boot mode of the information handling system:
   create a second plurality of tables associated with the BIOS firmware update image;
   compare the first and second tables; and
   in response to a difference being determined between the first and second tables, abort the BIOS update boot mode and generate an error log.

2. The information handling system of claim 1, wherein the storage of the first tables to the memory includes the processor to create a hand-off block, and execute the hand-off block to store the first tables in the memory.

3. The information handling system of claim 1, wherein the processor further to provide the error log to a manufacturer as telemetry data.

4. The information handling system of claim 3, wherein the processor further to receive a corrected BIOS firmware update image.

5. The information handling system of claim 4, wherein the corrected BIOS firmware update image is based on the telemetry data.

6. The information handling system of claim 1, wherein the aborted BIOS update boot mode prevents a BIOS update failure resulting from the difference.

7. The information handling system of claim 1, wherein the first tables includes a structure variable table for the current BIOS firmware image, a common configuration patch map table, and a platform configuration patch map table.

8. A method comprising:
 storing, in a memory of an information handling system, a current basic input/output system (BIOS) firmware image;
 during a regular boot mode of the information handling:
  creating, by a processor of the information handling system, a first plurality of tables associated with the current BIOS firmware image;
  storing the first tables to the memory; and
  receiving a BIOS firmware update image; and
 during a BIOS update boot mode of the information handling system:
  creating a second plurality of tables associated with the BIOS firmware update image;
  comparing the first and second tables; and
  in response to a difference being determined between the first and second tables, aborting, by the processor, the BIOS update boot mode and generate an error log.

9. The method of claim 8, wherein the storing of the first tables to the memory includes, the method further comprises:
 creating a hand-off block; and
 executing the hand-off block to store the first tables in the memory.

10. The method of claim 9, further comprising providing the error log to a manufacturer as telemetry data.

11. The method of claim 10, further comprising receiving a corrected BIOS firmware update image.

12. The method of claim 11, wherein the corrected BIOS firmware update image is based on the telemetry data.

13. The method of claim 9, wherein based on the aborting of the BIOS update boot mode, the method further comprises preventing a BIOS update failure resulting from the difference.

14. The method of claim 9, wherein the first tables includes a structure variable table for the current BIOS firmware image, a common configuration patch map table, and a platform configuration patch map table.

15. An information handling system comprising:
 a memory to store a current basic input/output system (BIOS) firmware image; and
 a processor to:
  load an initial boot block from the current BIOS firmware image;
  load an original equipment manufacturer boot block from a BIOS firmware update image;
  extract a first mapping table from the BIOS firmware update image;
  compare the first mapping table to a second mapping table, wherein the second mapping table is created from the current BIOS firmware image stored in the memory; and
  in response to a difference between the first and second mapping tables, abort a BIOS firmware image update and create an error log.

16. The information handling system of claim 15, wherein the processor further to provide the error log to a manufacturer as telemetry data.

17. The information handling system of claim 16, wherein the processor further to receive a corrected BIOS firmware update image based on the telemetry data.

18. The information handling system of claim 15, wherein the difference is based on the BIOS firmware update image including a first BIOS reference code that is different from a second BIOS reference code in the current BIOS firmware image.

19. The information handling system of claim 15, wherein the difference is based on the BIOS firmware update image including a first BIOS setup that is different from a second BIOS setup in the current BIOS firmware image.

* * * * *